(12) United States Patent
Lawrence

(10) Patent No.: US 7,548,883 B2
(45) Date of Patent: Jun. 16, 2009

(54) CONSTRUCTION INDUSTRY RISK MANAGEMENT CLEARINGHOUSE

(75) Inventor: David Lawrence, New York, NY (US)

(73) Assignee: Goldman Sachs & Co, New York, NY (US)

( * ) Notice: Subject to any disclaimer, the term of this patent is extended or adjusted under 35 U.S.C. 154(b) by 1274 days.

(21) Appl. No.: 10/633,080

(22) Filed: Aug. 1, 2003

(65) Prior Publication Data

US 2004/0083165 A1    Apr. 29, 2004

Related U.S. Application Data

(63) Continuation-in-part of application No. 10/074,584, filed on Feb. 12, 2002, now abandoned, and a continuation-in-part of application No. 10/021,124, filed on Oct. 30, 2001, now abandoned, which is a continuation-in-part of application No. 09/812,627, filed on Mar. 20, 2001.

(60) Provisional application No. 60/400,181, filed on Aug. 1, 2002, provisional application No. 60/390,459, filed on Jun. 20, 2002.

(51) Int. Cl.
    *G06Q 40/00* (2006.01)
(52) U.S. Cl. ................... 705/38; 705/35; 705/36 R
(58) Field of Classification Search ............... 705/35, 705/38, 40; 708/100, 105, 110; 434/72, 434/107, 219
    See application file for complete search history.

(56) References Cited

U.S. PATENT DOCUMENTS

| | | | |
|---|---|---|---|
| 4,326,259 A | 4/1982 | Cooper et al. | 364/715 |
| 4,346,442 A | 8/1982 | Musmanno | 364/408 |
| 4,376,978 A | 3/1983 | Musmanno | 364/408 |
| 4,597,046 A | 6/1986 | Musmanno et al. | 364/408 |
| 4,718,009 A | 1/1988 | Cuervo | 364/408 |
| 4,727,243 A | 2/1988 | Savar | 235/379 |

(Continued)

FOREIGN PATENT DOCUMENTS

EP    1 137 209    3/2001

(Continued)

OTHER PUBLICATIONS

Richard N. Clarke's article SICs as a Definition of Economic Markets, published in The Journal of Business, vol. 62, No. 1, Jan. 1989, p. 17-31.*

(Continued)

*Primary Examiner*—Mary Cheung
*Assistant Examiner*—Brian Fertig
(74) *Attorney, Agent, or Firm*—Walter G. Hanchuk; Chadbourne & Parke LLP

(57) ABSTRACT

Systems, methods, apparatus, computer program code and means for gathering, organizing and presenting on a real time basis information pertinent to Risks associated with subjects related to the Construction Industry. Risks associated with the Construction Industry can be managed by gathering data relevant to the Construction Industry from multiple sources and aggregating the gathered data according to one or more Risk variables. An inquiry relating to a Risk subject can be received and portions of the aggregated data can be associated with the Risk subject. The associated portions of the aggregated data can be transmitted to an entity placing the inquiry or other designated destination.

27 Claims, 8 Drawing Sheets

U.S. PATENT DOCUMENTS

| | | | |
|---|---|---|---|
| 4,734,564 A | 3/1988 | Boston et al. | 235/380 |
| 4,736,294 A | 4/1988 | Gill et al. | 364/408 |
| 4,774,663 A | 9/1988 | Musmanno et al. | 364/408 |
| 4,774,664 A | 9/1988 | Campbell et al. | 364/408 |
| 4,812,628 A | 3/1989 | Boston et al. | 235/380 |
| 4,868,866 A | 9/1989 | Williams, Jr. | 380/49 |
| 4,914,587 A | 4/1990 | Clouse | 364/408 |
| 4,953,085 A | 8/1990 | Atkins | 364/408 |
| 4,989,141 A | 1/1991 | Lyons et al. | 364/408 |
| 5,025,138 A | 6/1991 | Cuervo | 235/379 |
| 5,038,284 A | 8/1991 | Kramer | 364/408 |
| 5,068,888 A | 11/1991 | Scherk et al. | 379/100 |
| 5,161,103 A | 11/1992 | Kosaka et al. | 364/408 |
| 5,177,342 A | 1/1993 | Adams | 235/379 |
| 5,210,687 A | 5/1993 | Wolfberg et al. | 364/408 |
| 5,239,462 A | 8/1993 | Jones et al. | 364/408 |
| 5,274,547 A | 12/1993 | Zoffel et al. | 364/408 |
| 5,323,315 A | 6/1994 | Highbloom | 364/408 |
| 5,347,632 A | 9/1994 | Filepp et al. | 395/200 |
| 5,398,300 A | 3/1995 | Levey | 395/22 |
| 5,444,819 A | 8/1995 | Negishi | 395/22 |
| 5,457,305 A | 10/1995 | Akel et al. | 235/379 |
| 5,557,518 A | 9/1996 | Rosen | 364/408 |
| 5,627,886 A | 5/1997 | Bowman | 379/111 |
| 5,649,116 A | 7/1997 | McCoy et al. | 395/238 |
| 5,679,938 A | 10/1997 | Templeton et al. | 235/379 |
| 5,679,940 A | 10/1997 | Templeton et al. | 235/380 |
| 5,680,305 A * | 10/1997 | Apgar, IV | 705/10 |
| 5,696,907 A | 12/1997 | Tom | 395/238 |
| 5,704,045 A | 12/1997 | King et al. | 395/235 |
| 5,717,923 A | 2/1998 | Dedrick | 395/613 |
| 5,732,397 A | 3/1998 | DeTore et al. | 705/1 |
| 5,787,402 A | 7/1998 | Potter et al. | 705/37 |
| 5,790,639 A | 8/1998 | Ranalli et al. | 379/100.08 |
| 5,797,133 A | 8/1998 | Jones et al. | 705/38 |
| 5,819,226 A | 10/1998 | Gopinathan et al. | 705/1 |
| 5,819,236 A | 10/1998 | Josephson | 705/35 |
| 5,852,812 A | 12/1998 | Reeder | 705/39 |
| 5,875,431 A | 2/1999 | Heckman et al. | 705/7 |
| 5,878,400 A | 3/1999 | Carter, III | 705/20 |
| 5,884,289 A | 3/1999 | Anderson et al. | 705/44 |
| 5,940,843 A | 8/1999 | Zucknovich et al. | 707/516 |
| 5,963,923 A | 10/1999 | Garber | 705/37 |
| 5,991,743 A | 11/1999 | Irving et al. | 705/36 |
| 6,003,013 A | 12/1999 | Boushy et al. | 705/10 |
| 6,014,228 A | 1/2000 | Castro | 358/400 |
| 6,016,963 A | 1/2000 | Ezawa et al. | 235/492 |
| 6,018,723 A | 1/2000 | Siegel et al. | 705/38 |
| 6,021,397 A | 2/2000 | Jones et al. | 705/36 |
| 6,078,904 A | 6/2000 | Rebane | 705/36 |
| 6,078,905 A | 6/2000 | Pich-LeWinter | 705/36 |
| 6,085,175 A | 7/2000 | Gugel et al. | 705/36 |
| 6,119,103 A | 9/2000 | Basch et al. | 705/35 |
| 6,148,301 A | 11/2000 | Rosenthal | 707/10 |
| 6,199,073 B1 | 3/2001 | Peairs et al. | 707/204 |
| 6,205,433 B1 | 3/2001 | Boesch et al. | 705/26 |
| 6,219,805 B1 | 4/2001 | Jones et al. | 714/38 |
| 6,249,770 B1 | 6/2001 | Erwin et al. | 705/10 |
| 6,278,983 B1 | 8/2001 | Ball | 705/39 |
| 6,289,320 B1 | 9/2001 | Drummond et al. | 705/35 |
| 6,304,973 B1 | 10/2001 | Williams | 726/3 |
| 6,317,727 B1 | 11/2001 | May | 705/37 |
| 6,321,212 B1 | 11/2001 | Lange | 705/37 |
| 6,330,546 B1 | 12/2001 | Gopinathan et al. | 705/35 |
| 6,341,267 B1 | 1/2002 | Taub | 705/11 |
| 6,347,307 B1 | 2/2002 | Sandhu et al. | 705/35 |
| 6,393,423 B1 | 5/2002 | Goedken | 707/10 |
| 6,456,984 B1 | 9/2002 | Demoff et al. | 705/40 |
| 2001/0011243 A1 | 8/2001 | Dembo et al. | 705/36 |
| 2001/0027388 A1 | 10/2001 | Beverina et al. | 703/22 |
| 2001/0027389 A1 | 10/2001 | Beverina et al. | 703/22 |
| 2001/0044768 A1 | 11/2001 | Wares | 705/37 |
| 2001/0047279 A1 | 11/2001 | Gargone | 705/1 |
| 2001/0049651 A1 | 12/2001 | Selleck | 705/37 |
| 2001/0054020 A1 | 12/2001 | Barth et al. | 705/37 |
| 2002/0016854 A1 | 2/2002 | Hirasawa et al. | 709/236 |
| 2002/0019804 A1 | 2/2002 | Sutton | 705/38 |
| 2002/0032635 A1 | 3/2002 | Harris et al. | 705/37 |
| 2002/0032646 A1 | 3/2002 | Sweeney et al. | 705/38 |
| 2002/0046053 A1 | 4/2002 | Hare et al. | 705/1 |
| 2002/0091635 A1 | 7/2002 | Dilip et al. | 705/39 |
| 2002/0099640 A1 | 7/2002 | Lange | 705/37 |
| 2002/0103747 A1 | 8/2002 | Lawrence | 705/38 |
| 2002/0111890 A1 | 8/2002 | Sloan et al. | 705/36 |
| 2002/0138371 A1 | 9/2002 | Lawrence et al. | 705/27 |
| 2002/0138407 A1 | 9/2002 | Lawrence et al. | 705/38 |
| 2002/0138408 A1 | 9/2002 | Lawrence | 705/38 |
| 2002/0143562 A1 | 10/2002 | Lawrence | 705/1 |
| 2003/0069742 A1 | 4/2003 | Lawrence | 705/1 |
| 2003/0074310 A1 | 4/2003 | Grovit et al. | 705/39 |
| 2003/0138407 A1 | 7/2003 | Lawrence et al. | 705/38 |

FOREIGN PATENT DOCUMENTS

| | | |
|---|---|---|
| EP | 1 143 365 | 4/2001 |
| JP | 02000020618 A | 6/1998 |
| JP | 0200350896 A | 8/2001 |
| WO | WO 00/75836 | 12/2000 |
| WO | WO 01/55885 | 8/2001 |

OTHER PUBLICATIONS

EPA Asbestos Ban: Calrification May 18, 1999, retrieved from http://www.epa.gov/asbestos/pubs/asbbans2.pdf, May 29, 2008.*

The Federal Trade Commission's article Fair Credit Reporting, Mar. 1999, retrieved from http://www.pueblo.gsa.gov/cic_text/money/fair-credit/fair-crd.htm, May 29, 2008.*

Anthony Mills article "A systematic approach to risk management for construction", published in Str4uctural Survey, vol. 19, No. 5, p. 245, 2001.*

Int'l Search Report from PCT/US03/23310 dated Jun. 18, 2004.

"Firms Consider Pact to Track Terror Money." Wall Street Journal, Nov. 26, 2001.

World-Check Search—Vladimir Gusinsky (Russia).

"Transforming Discovery Into Opportunity"; "Key Personnel Bios"; "Frequently Asked Questions"; Mantas. Mantas, Inc., Announces Funding and Management Team:, Mantas, Jun. 4, 2001. "Safeguard and SRA Partner to Launch Mantas, Inc.", Mantas, Jun. 4, 2001. "Knowledge Discovery Platform"; "Money Laundering Detection for Banks"; "Fraud and Money Laundering Detection for Securities Firms"; "Best Execution"; "Equities Trading Compliance"; Mantas.

Power, Stephen "Background Checks Await Fliers." The Wall Street Journal, Jun. 7, 2002.

Purcell, Lea "Roping in Risk." Factiva, May 1, 1994.

McLure, Leslia "Taking the Risk Out of Transactions." Factiva, Mar. 1, 1994.

Healy, Thomas J. "The New Science of Borrower Behavior." Factiva, Feb. 1, 1998.

Quinn, Jane Bryant "Credit Card Issuers; Keeping a Closer Watch on How You Pay Bills." The Washington Post, Apr. 25, 1988.

Gullo, Karen "Neutral Nets Versus Card Fraud; Chase's Software Learns to Detect Potential Crime." The American Banker, Feb. 2, 1990.

Grafton, David. "Analysing Customers With Behavioural Modelling." Credit Control, vol. 17, 1996, pp. 27-31.

Aguais, Scott D. "It's the Economy." Credit Card Management, vol. 5, 1993, pp. 58-60.

"Five Ways to Reduce Risk with Neutral Networks." Credit Risk Management Report, vol. 3, Jun. 27, 1993.

Leonard, Kevin J. and William J. Banks. "Automating the Credit Decision Process." Journal of Retail Banking, vol. 16, 1994, p. 39.

Higgins, Kevin T. "Retention by the Numbers." Credit Card Management, vol. 5, 1993, pp. 52-56.

Caudill, Maureen et al., "Naturally Intelligent Systems." *The MIT Press*, 1990.

"Enterprise Anti-Money Laundering Product Specification." *Mantas*, 2001.

Everest-Hill, Deborah et al., "Automating Risk Assessment." *The Internal Auditor*, vol. 56, Jun. 1999, pp. 23-25.

Chandler, Gary "Credit Scoring; A Feasibility Study." *Executive*, 1985.

Hicks M., "What, me spam?" Good intentions alone aren't enough to avoid alienating customers, e Week Sep. 3, 2001, retrieved from Dialog, Dialog No. 08984028, see abstract.

Banasiak, Michael, "Don't be Out-Scored by Your Competition", *Credit and Financial Management Review*, $2^{nd}$ Quarter 2000.

Barrett, Jennifer, "Banking on Software Solutions", *Newsweek Web*, Jun. 12, 2002.

* cited by examiner

| 410 | Aggregate Risk Variable Related Data |

| 411 | Receive a Source of the Risk Variable Related Data |

| 412 | Enhance Risk Variable Related Data |

| 413 | Receive Risk Subject Description Data |

| 414 | Enhance Risk Subject Description Data |

| 415 | Perform Data Inquiry |

| 416 | Perform Augmented Risk Related Search |

| 417 | Archive Data: Risk Subject Description, Search Terms and Search Results |

| 418 | Generate Reports |

Fig. 4

| 510 | Transmit Information Descriptive of a Risk Subject |

| 511 | Receive Information Relating to the Risk Subject |

| 512 | Receive Information Relating to an Enhanced Risk Subject |

| 513 | Receive Augmented Information Relating to a Risk Subject |

| 514 | Request a Link to an Information Source |

| 515 | Receive Link Pertaining to the Information Source |

| 516 | Archive Information Relating to Associated Risk and Steps Taken to Address the Risk |

| 517 | Generate Reports |

Fig. 5

610 Indicate an Entity is a Consrtuction Industry Entity

611 Gather Data Generally Related to Construction Entities

612 Receive Information Descriptive of Details of a Financial Transaction

613 Structure Gathered Data

614 Calculate Risk Quotient

615 Generate Report

| Risk Variable 802 | Construction Industry Company 804 | Publication 806 | Source Identification Number 808 |
|---|---|---|---|
| Consumer Complaint | CBHI | Reference 10023 | S0010 |
| Building Violation | TURNER | Reference 10024 | S0966 |
| Statutory Violation | ASTR | Reference 10025 | S10099 |
| Organized Crime Affiliation | UBM | Reference 10026 | S00455 |
| Political Corruption | EQR | Reference 10027 | S99077 |

FIG. 8

CONSTRUCTION INDUSTRY RISK MANAGEMENT CLEARINGHOUSE

CROSS REFERENCE TO RELATED APPLICATIONS

This application claims the benefit of the filing date of [U.S. Provisional application no. 60/390,459 entitled "Propriety Risk Management", filed Jun. 20, 2002. This application also claims the benefit of the filing date ] of U.S. Provisional application no. 60/400,181 entitled "Construction Industry Contract Risk Management Clearinghouse", filed Aug. 1, 2002. This application is a continuation-in-part of a prior application entitled "Risk Management Clearinghouse" filed Feb. 12, 2002 and bearing the Ser. No. 10/074,584 now abandoned, as well as being a continuation-in-part of a prior application entitled "Risk Management Clearinghouse" filed Oct. 30, 2001, and bearing the Ser. No. 10/021,124 now abandoned,.which is also a continuation-in-part of a prior application entitled "Automated Global Risk Management" filed Mar. 20, 2001, and bearing the Ser. No. 09/812,627, all of which are relied upon and incorporated by reference.

FIELD

The present invention relates to systems, methods, apparatus, computer program code and means for facilitating the identification, investigation, assessment and management of legal, regulatory and reputational risks ("Risks"). More particularly, embodiments of the present invention relate to systems, methods, apparatus, computer program code and means to conduct due diligence and research and make informed decisions to manage Risks related to the business, manufacture, repair, maintenance and finance of man made structures (Construction Industry).

BACKGROUND

The Construction Industry is nationally important in terms of economic value and social concern. In addition to involving a significant portion of national productivity, the Construction Industry is responsible for building facilities and infrastructure to enable productivity. The Construction Industry provides shelter and the ability to access that shelter. The efficiency and forthrightness with which the Construction Industry operates can have far reaching impact on the economic well being of and quality of life of many people.

Construction can include many multifaceted interactions and events which are influenced by, and can influence, a wide number of entities and industries. Government entities, financial institutions, real estate developers, property owners, construction material providers, equipment and machinery manufacturers, regulators, planners, architects, unions, engineers and journeymen can all be closely affected by events in the construction industry. In addition, housing starts and construction projects can be key indicators as to the state of an economy.

Risk related to the Construction Industry can be subject to circumstances and developments involving any of these entities or interactions. Being kept apprised of the many details necessary to make informed decisions can be a difficult task.

An investor, compliance officer, developer, government entity, financial institution or other personnel typically have few resources available to assist them with the identification of present or potential risks associated with a particular entity, development or transaction involving the Construction Industry. Risks can be multifaceted and far reaching. The amount of information that needs to be considered to evaluate whether involvement with a particular Construction Industry entity poses a significant risk or should otherwise be restricted, is substantial.

However, institutions do not have available a mechanism which can provide real time assistance to assess one or more Risk variables associated with the Construction Industry, or otherwise qualitatively manage such risk. In the event of an investment problem, it is often difficult to quantify to regulatory bodies, shareholders, newspapers and/or other interested parties, the diligence exercised by the entity taking action to properly identify and respond to risk factors. Absent a means to quantify good business practices and diligent efforts to contain risk, an entity taking action may appear to be negligent in some respect.

General data services that are available to search news sources and other public information will accept a query and return a result. However, such services are not integrated into a risk management system. In addition, present data services only return a flat response to a query submitted without any further data mining or scrubbing. The inefficiency of having to manually ascertain what terms should be searched and then submit query that includes those terms makes these systems overbearing on a transaction by transaction basis. Also, over time, databases can accrue a wide range of inaccuracies and inconsistencies, such as misspelled names, inverted text, missing fields, alternate spelling of key phrases, and other blemishes. Fixing such faulty records by hand on a timeframe needed to perform risk management associated with a financial transaction may be impossible as well as expensive and could result in the introduction of even more errors.

Currently there is no convenient way to facilitate a comprehensive analysis of a Construction Industry related entity without strenuous research of multiple disparate sources. What is needed is a tool to facilitate Risk analysis of Construction Industry related subjects.

SUMMARY

Accordingly, to alleviate problems inherent in the prior art and facilitate Risk analysis of Construction Industry related subjects, embodiments of the present invention introduce systems, methods, apparatus, computer program code and means for gathering, organizing and presenting on a real time basis information pertinent to Risks associated with Construction Industry related subjects. According to some embodiments, Risks associated with the Construction Industry can be managed by gathering data relevant to the Construction Industry from multiple sources and aggregating the gathered data according to one or more Risk variables. An inquiry relating to a Risk subject associated with the Construction Industry can be received and portions of the aggregated data can be associated with the Risk subject. The associated portions of the aggregated data can be transmitted to an entity placing the inquiry or other designated destination.

Systems, methods, apparatus, computer program code and means for managing Risks are also provided where an alert can be implemented to continually monitor data and transmit any updated data associated with the Risk subject.

Systems, methods, apparatus, computer program code and means for managing Risks can be implemented by interacting with a network access device to access a risk management server. Interaction can be initiated via a communications network and information descriptive of a Risk subject related to the Construction Industry can be input and transmitted to a risk management clearinghouse server. The server can respond by transmitting data associated with Risk variables that relate to the Risk subject which can be received at the network access device.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 4 illustrates a flow of exemplary steps that can be executed by a system to implement augmented data;

FIG. 5 illustrates a flow of exemplary steps that can be taken by a user of the RMC risk management system; and FIG. 6 is a table illustrating an exemplary data structure of a RMC database for use in the present invention.

DETAILED DESCRIPTION

Figure 1:
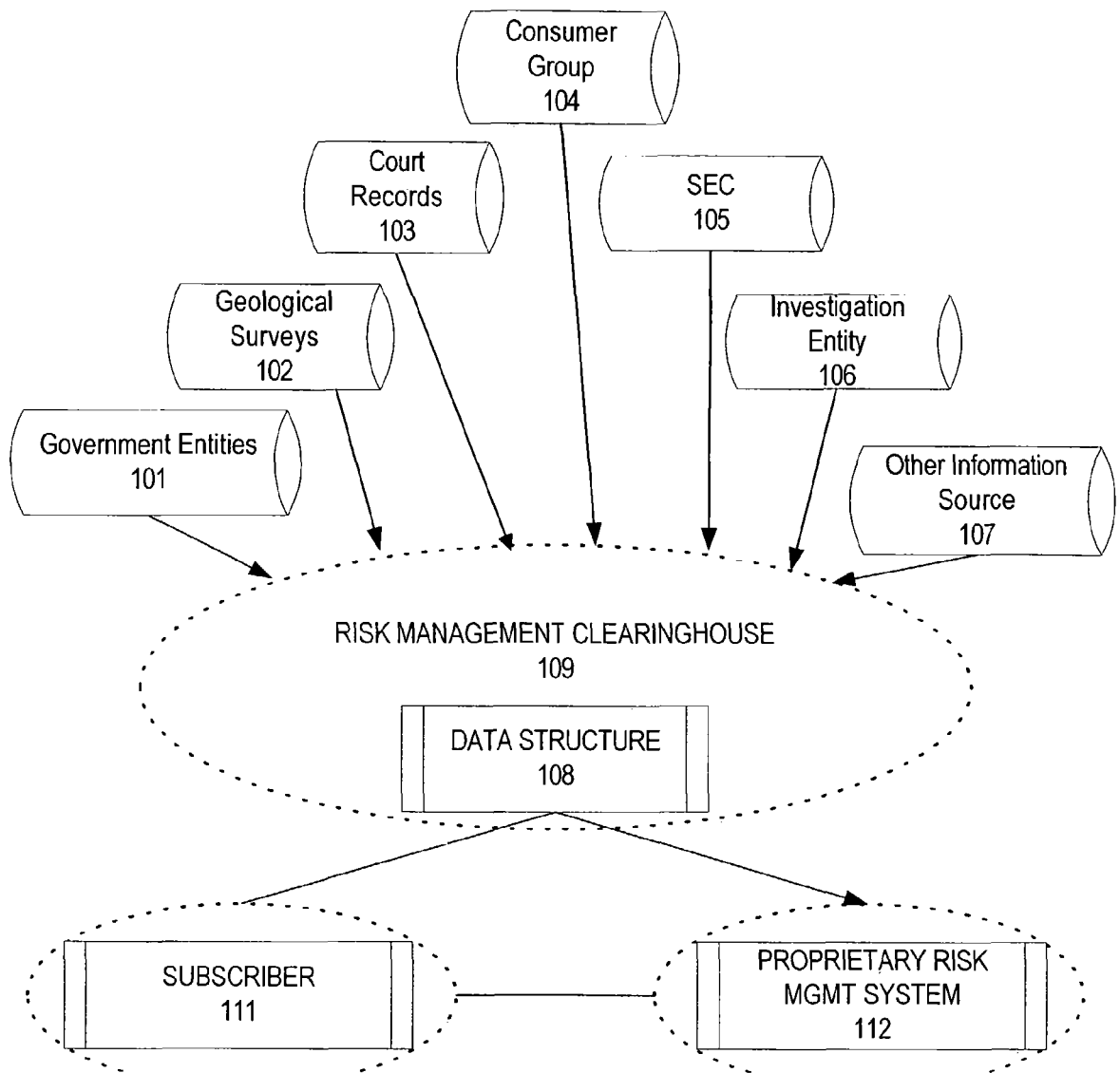
FIG. 1 illustrates a block diagram that can embody this invention.

The present invention includes computerized systems and methods for managing regulatory, reputational and legal Risks associated with the Construction Industry. A computerized system continuously gathers and stores information as data in a database or other data storing structure and processes the data in preparation for a Risk inquiry search relating to a Risk. Document images and other informational artifacts as well as sources of information or informational artifacts can also be stored. A subscriber, such as an investor, a special interest group, a government entity, a financial institution, an insurance company, or other interested party, can submit a Risk management subject for which a Risk inquiry search can be performed. A Risk assessment or Risk inquiry search can be made against the gathered data and a comprehensive, real time list of reference documents, related sources, reports and other data related to the Risk subject can be provided.

Definitions

To aid in the description of the present invention, the following definitions can apply to terms utilized throughout this document:

Construction Industry Entity: any statutory "person" that engages in the design, building, manufacture, repair and/or maintenance of a man made structure.

Financial Transaction: a Financial Transaction refers to any action that anticipates a transfer of money from a first set of one or more Transaction Participants to a second set of one or more Transaction Participants. Examples of Financial Transactions can include: investment and merchant banking, public and private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions.

Informational Artifact: Informational Artifact refers to a media item that contains information that can be interpreted into a humanly ascertainable form. Examples of Informational Artifacts include: a news article, a news feed portion, a video segment, a newscast, a report, an identifiable document, an agency listing, a list, a government publication, other identifiable publication, a sound byte, a sound recording, or other media item.

Risk Bearing Institution: a Risk Bearing Institution refers to any person, entity, company, corporation or statutory "person" in the business of providing Financial transactions. As such a Risk Bearing Institution can include, for example: a securities broker, a retail bank, a commercial bank, investment and merchant bank, private equity firm, asset management company, a mutual fund company, a hedge fund firm, insurance company, a credit card issuer, retail or commercial financier, a securities exchange, a regulator, a money transfer agency, bourse, an institutional or individual investor, an auditing firm, a law firm, any institution the business of which is engaging in financial activities as described in section 4($k$) of the Bank Holding Act of 1956 or other entity or institution who may be involved with a financial transaction or other business transaction or any entity subject to legal and regulatory compliance obligations with respect to money laundering, fraud, corruption, terrorism, organized crime, regulatory and suspicious activity reporting, sanctions, embargoes and other regulatory risks and associated obligations.

Risks: Risks associated with a financial transaction can include factors associated with security risk, financial risk, legal risk, regulatory risk and reputational risk. A Security Risk refers to breach of a safety measure that may result in unauthorized access to a facility; unauthorized access to data; physical harm, including threat of immediate risk of harm to a person or goods. Financial Risk refers to factors indicative of monetary costs that the Risk Bearing Institution or a Transaction Participant may be exposed to as a result of a particular Financial Transaction. Monetary costs can be related to fines, forfeitures, costs to defend an adverse position, lost revenue, or other related potential sources of expense. Regulatory Risk refers to factors that may cause the Risk Bearing Institution or Transaction Participant to be in violation of rules put forth by a government entity or regulatory agency. Reputational risk relates to harm that a Risk Bearing Institution or Transaction Participant may suffer regarding its professional standing in an industry or the public eye. A Risk Bearing Institution and Transaction Participant can suffer from being associated with a situation that may be interpreted as contrary to an image of diligence, honesty and forthrightness.

Risks may be related to the duty to disclose material information, to report and possibly prevent: fraud, money laundering, foreign corrupt practices, bribery, embargoes and sanctions. Timely access to relevant data on which to base a regulatory or reputational Risk related action can be critical to conducting business and comply with regulatory requirements such as those set forth by the Patriot Act in the United States.

Risk Management Clearinghouse (RMC): RMC refers to computerized systems and methods for managing Risks and associating information and/or informational artifacts useful for quantifying Risk with a Risk subject, as more fully described in the related patent applications: U.S. Ser. No. 10/074,584 entitled "Risk Management Clearinghouse" filed Feb. 12, 2002, and U.S. patent application Ser. No. 10/021,124 entitled "Risk Management Clearinghouse" filed Oct. 30, 2001.

Risk Quotient: Risk Quotient refers to a quantitative value of an amount of Risk, a Risk Quotient can be based upon a weighted algorithm applied to the Risk criteria and informational artifacts.

Risk Variable: A Risk variable can be any data that can cause a Risk level to change. Construction Industry Risk variables may include, for example, data descriptive of issues which may be addressed by federal statute, such as: the ability to select a qualified physician or other healthcare professionals; advanced notification concerning procedures or treatments, including changes to current treatment or treatment providers; participation in changes to care and treatment or planning care and treatment; incidence of physical abuse, corporal punishment, involuntary seclusion, physical or chemical restraints imposed for purposes of discipline or convenience; privacy issues including accommodations, medical treatment, written and telephonic communications, visits, meetings of family and resident groups; confidentiality regarding medical and personal records; a right to voice complaints without fear of discrimination or reprisal; accommodation of needs of preferences; access and visitation rights, including immediate access by eligible parties; equal access to quality care regardless of a source of payment; admissions policies; transfer and discharge rights; preparation and orientation; notice of bed hold period; priority re-admissions; relocation; right to be informed; religious practices available at a Construction Industry facility; payment obligations; survey or inspections schedules and results; treatment of personal funds; statements of resident rights; and other information which may be associated with the subject matter of federal, state or local statute. Some embodiments can include associating a related statute or regulation, such as for example, a Federal or State statute or regulation, with a portion of the gathered data.

Subscriber: A Subscriber refers to an authorized user of, or recipient of services provided by, a Risk Management Clearinghouse or Proprietary Risk Management Clearinghouse.

Transaction Participant: Transaction Participant refers to a person who will partake in a Financial transaction.

Risk associated with the Construction Industry can include factors associated with financial risk, legal risk, regulatory risk and reputational risk. Financial risk can include factors indicative of monetary costs that an institution may be exposed to as a result of a particular association or action. Monetary costs can be related to fines, forfeitures, costs to defend an adverse position, lost revenue, or other related potential sources of expense.

Regulatory risk includes factors that may cause an institution to be in violation of rules put forth by a regulatory agency such as the Securities and Exchange Commission (SEC), a state licensing board, or other agency. Reputational risk can relate to harm that an institution may suffer regarding its professional standing in the industry. An institution can suffer from being associated with a situation that may be interpreted as contrary to an image of honesty and forthrightness. Such risks can also befall other circumstances, such as, for example, situations involving the Construction Industry and links to organized crime or political corruption.

Risk associated with the Construction Industry can be greatly increased due to the difficulty in gathering and accessing pertinent data on a basis timely to managing risk associated with particular facts or documents. As part of due diligence associated with becoming associated with, or investing in, an entity in the Construction Industry, it is important to ascertain a level of Risk generated by a situation. Such due diligence may be related, for example, to potential investment activity, public relations activity, business transactions, political or charitable donations or other activity.

The Risk assessment or inquiry search can include data retrieved as a result of augmented retrieval methods. Scrubbed data as well as augmented data can be transmitted from a Risk management clearinghouse (RMC) to a subscriber or to a proprietary Risk system utilized by a subscriber, such as a Risk management system maintained in-house. Risk inquiry searches can be automated and made a part of standard operating procedure for decision making processes and due diligence performed by the subscriber.

Referring now to FIG. 1 a block diagram of some embodiments of the present invention is illustrated. An RMC system 109 gathers and receives information which may be related to Risk variables associated with the Construction Industry. Information may be received, for example, from publicly available sources, such as, for example: a government entity 101, a geological survey 102, Court Records 103; Consumer Groups 104, the Securities and Exchange Commission 105, subscribers 111, investigation entity 106, or other source 107. The information can be constantly updated and can be related to: a Construction Industry company; a Construction Industry project; an affiliation to a Construction Industry company, such as a parent corporation; or other Construction Industry related subject or Construction Industry related alert list in order to facilitate due diligence or other research efforts. The RMC system 109 facilitates due diligence on the part of a subscriber 111 by gathering, structuring and providing to the subscriber 111 data that relates to Risk variables involved with a designated Construction Industry subject.

Information relating to a Risk variable can include any data that can cause a Risk level to change. Construction Industry related Risk variable information may include, for example: subjects addressed by federal statute or regulation such as the U.S. Code or Federal Register; news reports; instances of political corruption; State licensing authorities; evidence of ties to organized crime; an Office of Safety and Regulation; State statutes and regulations; data from the Project of Government Oversight (POGO); actions by a Federal Senate or House Committee, such as, for example, the House Judiciary Committee, the House Government Reform Committee, the Senate Governmental Affairs Committee; General Accounting Office actions; changes to the Internal Revenue Tax Code; actions by the U.S. Treasury; or other variables.

Information descriptive of Risk variables related to government can be gathered, for example, from: the American Disabilities Act (ADA) Accessibility Guidelines; Central Contractor Registration; the Consumer Information Center; Census Bureau; the Debarment List of parties excluded from Federal Procurement; the Davis-Bacon Wage Determinations; the Bureau of Reclamation; Department of Commerce; the Department of Defense, the Army Corps of Engineers; the Department of Housing and Urban Development; the Department of State; Department of Labor; the Department of Transportation; Environmental Protection Agency; the Federal Emergency Management Agency, the Federal Highway Administration; Federal Housing Finance Board; Federal Railroad Administration; General Services Administration; the Internal Revenue Service; the International Trade Commission; National Institute for Standards and Technology, the National Labor Relations Board; the National Park Service; the Overseas Private Investment Corporation; the Trade and Development Agency; U.S. Geological Survey; Fish and Wildlife Service; the Whitehouse; or other federal entity.

Information gathered from Federal Government sources can include, for example, information descriptive of: construction contracts; new projects; worker compensation or other standards; building requirements; civil works, disaster response; military construction; development programs; demographic data; economic data; business information on contractors doing business for the government; parties excluded from being awarded federal contracts; loans and grants available for construction projects; tax credits for construction projects; contracting opportunities for domestic or foreign building operations, including current contracts and procurement forecasts; facility construction information and projects to be issued for bid; issues relating to hazardous materials; flood zones; seismically active areas; safety and health issues; endangered species and habitat conservation information; environmental cleanup; and other information.

Risk criteria can include, for exemplary purposes: financial information related to a Construction Industry company or project; annual reports; government filings, personnel employed by the Construction Industry or on a Construction Industry project; stock price and/or history of a Construction Industry entity; corporate bonds issued, equity offerings; bankruptcy proceedings; litigations involving a Construction Industry entity or Construction Industry project; types of activities undertaken by a Construction Industry entity; demographics of clientele, employees, owners, or other interested people; Construction Industry business developments such as, for example, mergers, acquisitions, expansion, additional services or other material developments; government or regulatory actions implemented concerning the Construction Industry entity or project; history of fraud or money laundering associated with a Construction Industry entity, project, or employee; felony history associated with a Construction Industry entity or employee; building materials associated with a project; labor situations associated with Construction Industry entity or project; or other factors.

Risk variable related information can also be received from formalized lists, such as, for example: a list generated by a consumer watchdog group, a list generated by a state or federal agency, publications by Construction Industry advocates, construction project opposition groups, watchdog groups, publications by organizations with interested constituents, such as the National Labor Relations Board (NLRB), a union entity, a list set forth by a State or Federal Attorney General's Office or other source of Risk variables.

Court records or other references relating to violation of regulatory statute, fraud, bankruptcy, professional reprimand or a rescission of a right to run a gambling activity, prison records or other source of suspect behavior can also be an important source of information.

Gathered information can also include information indicative that a Construction Industry entity does not present high Risk, such as participation on a major trading exchange, recommendation by an advocacy group, prior history of accomplishments and goodwill, records of capital holdings, records of intellectual property or other favorable factor.

A subscriber 111 can include, for example: an investor, a consumer or consumer group, a government entity, a securities broker, a bank, a private equity firm, an asset management company, a mutual fund company, a hedge fund firm, a local community, a securities exchange, an institutional or individual investor, an auditing firm, a law firm, any institution which includes in its business, investment in, advice relating to, or involvement with a Construction Industry project or Construction Industry company.

In some embodiments, information can be received by the RMC 109 from a subscriber 111. Information supplied by a subscriber 111 can include data gathered according to a normal course of dealings with a particular Construction Industry related entity. For example, a Construction Industry company may supply information to the RMC 109 relating to its operations and activities, or the SEC may receive information from the Construction Industry which is subsequently received by the RMC 109.

Manufacturers, suppliers, architects, consultants, developers, or other professions related to building material, construction machinery, construction equipment, providers of support services, labor unions and other related parties can be included as part of the Construction Industry. Support services, can include, for example: architects, interior designers, engineers urban planners, landscaper designers, engineers and the like. Risk subjects can take into consideration the ability of the Construction Industry to be competitive through high quality output at a reasonable cost.

Similarly, Financial Institutions and government entities or regulators can also be considered as part of the Construction Industry via their role in establishing a business environment in which the sector must operate. Risk subjects associated with Financial Institutions and government entities can include, for example, the availability of financing and project approval. Support services, can include, for example: architects, interior designers, engineers, urban planners, landscaper designers, engineers and the like.

A financial investment that involves a Construction Industry company or a Construction Industry project can include, for example: public and private financing; securities trading; commercial and consumer lending; asset management; rating of corporations and securities; public and private equity investment; public and private fixed income investment; listing of a company on a securities exchange; employee screening; auditing of corporate or other entity; legal opinions relating to a corporate or other entity, or other business related transactions.

A decision involving a Construction Industry company or project can be dependent upon many factors. A multitude and diversity of Risks related to the factors may need to be identified and evaluated. In addition, the weight and implications of the factors and associated Risks can be interrelated. The present invention can provide a consistent and uniform method for a consumer, business, legal, compliance, credit and other related interest to identify and assess Risks associated with a Construction Industry company or project. An RMC system 109 can allow Construction Industry related and investment activity Risks to be identified, correlated and quantified by a subscriber on a confidential or public basis and facilitate the assessment of legal, regulatory, financial and reputational exposure.

Similarly, the RMC system 109 can support a financial institution's effort to meet requirements regarding the maintenance of accurate books and records relating to their financial transactions involving the Construction Industry and affirmative duty to disclose material issues affecting an investor's decisions involving the Construction Industry.

Information gathered from the diversity of data sources can be aggregated into a searchable data storage structure 108. Some embodiments can include receiving and storing a source of information. In some instances, a subscriber 111 may wish to receive information regarding the source of information received, such as, for example, if a subscriber wishes to pursue obtaining additional related information; ascertain the veracity of the information; check to see how current the information is; determine credibility of the information or of the source, or other reason. Gathering data 108 into an aggregate data structure 108, such as a data warehouse can allow a RMC system 109 to have the data 108 readily available for processing a Risk management search associated with a Risk subject. Aggregated data 108 can also be scrubbed or otherwise enhanced.

In some embodiments including enhanced data, data scrubbing can be utilized to implement a data warehouse comprising the aggregate data structure 108. Data scrubbing can access information from multiple databases 108 and store it in a manner that gives more efficient more flexible access to key facts. Scrubbing can facilitate expedient access to accurate data commensurate with a critical decision that may be based upon a Risk management assessment provided.

Various data scrubbing routines can be utilized to facilitate aggregation of Risk variable related information. The routines can include programs capable of correcting a specific type of mistake, such as an incomprehensible address, or clean up a full spectrum of commonly found database flaws, such as field alignment that can pick up misplaced data and move it to a correct field, or removing inconsistencies and inaccuracies from like data. Other scrubbing routines can be directed directly towards specific Construction Industry issues, such as environmental issues, auditing results, filed complaints or court records.

A scrubbing routine can be useful, for example, to facilitate coordination of related terms utilized in different jurisdictions, such as by various State agencies, commissions or other entities responsible for oversight of the Construction Industry within their respective jurisdiction. A data scrubbing routine can be programmed to facilitate Risk variable searching for multiple spellings of an equivalent term, different terminology utilized for similar functions or other important information. Such a routine can enhance the value of the aggregate data gathered and also help correct database flaws. Scrubbing routines can improve and expand data quality more efficiently than manual mending and also allow a subscriber 111 to quantify best practices for regulatory or other purposes.

Retrieving information related to Risk variables from the aggregated data 108 is an operation with the goal to fulfill a given request. In order to process a request against a large document set of aggregated Risk data with a response time acceptable to the user, it may be necessary to utilize an index based approach to facilitate acceptable response times. A direct string comparison based search may be unsuitable for the task.

Manufacturers, suppliers, architects, consultants, developers, or other professions related to building material, construction machinery, construction equipment, providers of support services, labor unions and other related parties can be included as Risk subjects or otherwise associated with a Risk variable related to the Construction Industry. Similarly, support services can include, for example: architects, interior designers, engineers urban planners, landscaper designers, engineers and the like. Risk subjects can take into consideration the ability of the Construction Industry to be competitive through high-quality output at a reasonable cost.

Financial Institutions and government entities or regulators can also be considered as part of the Construction Industry via their role in establishing a business environment in which the sector must operate. Risk subjects associated with Financial Institutions and government entities can include, for example, the availability of financing and project approval.

An index file for a collection of documents can be built upon receipt of new data and prior to a query or other request. The index file can include a pointer to a document and also include important information contained in a document. During a query, the RMC system 109 can match the query against a representation of one or more documents, instead of the documents themselves. The RMC system 109 can retrieve any documents referenced by the indexes in order to satisfy a request submitted by a subscriber 111. However, it may not be necessary to retrieve a full document as an index record may contain enough relevant information gleaned from the document it points to. Therefore, in some instances a subscriber 111 may be able to obtain information of interest without having to read a related source document.

For example, at least two retrieval models can be utilized in fulfilling a search request: a Boolean retrieval model can partition a document set into disjoint parts such that one part can fulfill the query and the other part not fulfill it. A relevance ranking retrieval model can consider all documents relevant to a certain degree. Boolean logic models can use exact matching. Relevance ranking models can typically utilize fuzzy logic, vector space techniques, neural networks, and probabilistic schema.

Augmenting data can include data mining techniques which utilize software to analyze and sift through aggregated data 108 using techniques such as mathematical modeling, statistical analysis, pattern recognition, rule based trends or other data analysis tools. In contrast to a system that may have gathered and stored information in a flat file and presented the stored information when requested, such as in a defined report related to a specific Risk subject, or other ad hoc access concerned with a particular query at hand, the present invention can provide Risk related searching that adds a discovery dimension by returning results that a human operator may find labor and cognitively intense.

This discovery dimension supplied by the RMC system 109 can be accomplished through the execution of augmenting techniques, such as data mining, applied to the Risk related data that has been aggregated. Data mining can include the extraction of implicit, previously unknown and potentially useful information from the aggregated data. This type of extraction can include unlooked for correlations, patterns or trends. Other techniques that can be applied can include fuzzy logic and/or inductive reasoning tools.

Embodiments can include a subscriber 111 accessing the RMC system 109 via a computerized system as discussed more fully below. The subscriber 111 can input a description of a Risk subject, or other inquiry, such as, for example, the name of a party involved with the Construction Industry project. In some instances, and in accordance with applicable laws, identifying information relating to an individual can also be input, such as a date of birth, a place of birth, a social security number or other identifying number, or any other descriptive information. The RMC system 109 can receive any input information descriptive of the Risk subject and perform a Risk related inquiry or search related to the Risk subject on the scrubbed data.

Embodiments can also include utilization of a computerized proprietary Risk management (PRM) system 112. The PRM system 112 can receive an electronic feed from an RMC system 109 with updated raw data, scrubbed data or other data embodiment. In addition, data mining results can also be transmitted to the PRM system 112 or performed by the PRM system 112 for integration into the Risk management practices provided in-house by the subscriber 111.

Information entered by a subscriber 111 into a PRM system 112 may be information gathered according to a normal course of dealings with a particular entity or as a result of a concerted investigation. In addition, since the PRM system 112 is proprietary, and a subscriber 11 responsible for the information contained therein can control access to the information contained therein, the PRM system 112 can include information that is public or proprietary.

In addition, some embodiments can include information entered into a PRM system 112 which can be shared with a RMC system 109. Informational data can be shared, for example via an electronic transmission or transfer of electronic media. However, RMC system 109 data may be subject to applicable local or national law and safeguards should be adhered to in order to avoid violation of such law through data sharing practices. In the event that a subscriber 111, or other interested party, discovers or suspects that a person or entity is involved in a fraudulent or otherwise illegal activity, the system can also be utilized to generate a report containing related information which can be distributed to an appropriate authority.

A log or other stored history can be created by the RMC system 109 and/or a PRM system 112, such that utilization of the system can mitigate adverse effects relating to a problematic situation. Mitigation can be accomplished by demonstrating to an investor or other interested party that due diligence is being addressed through tangible Risk management processes.

Questions can also be presented to an inquiry initiator by a programmable robot via a GUI. Questions can relate to a particular Construction Industry company or a Construction Industry project, a particular type of client, a type of investment, or other criteria or subject.

A query may, for example, search for information relating to a Risk subject, such as an individual or circumstance associated with Construction Industry and provide questions, historical data, world event information and other targeted information to facilitate a determination of Risk associated with a Risk subject. For example, a query regarding a Risk entity's financial position can be input and include reference to a Construction Industry project, a Construction Industry company, a parent organization, or other related detail. Measures can also be put in place to ensure that all such inquiries should be subject to prevailing law and contractual obligations.

A query can include direct input into a RMC system 109, such as through a graphical user interface (GUI) with input areas or prompts. A query can also be automatically generated from monitoring transactions, investments, recommendations or other actions undertaken by a subscriber 111. For example, an information system can electronically scan communication data for key words, entity names, treatment types or other pertinent data. Programmable software can be utilized to formulate a query according to names, activity descriptions, investments or other pertinent data and run the query against a database 108 maintained by the RMC system 109. Other methods can include voice queries via a telephone or other voice line, such as voice over internet, fax, electronic messaging, or other means of communication.

Prompts or other questions proffered by the RMC system 109 can also depend from previous information received. Information generally received, or received in response to the questions, can be input into the RMC system 109 from which it can be utilized for real time Risk assessment.

Some embodiments can include generation of a Risk valuation, such as a Risk quotient, which is a rating or other value indicative of an amount of Risk associated with a Risk subject. If desired, a RMC server 210 or a PRM server 112 can also generate a suggested action to take responsive to a particular risk quotient.

Some embodiments can also include an alert list containing names and/or terms of interest to a subscriber 111 which are supplied to a RMC system 109 by a subscriber 111 or other source 107. An alert list can be customized and specific to a subscriber 111. The RMC system 109 can continually or periodically monitor data in the RMC database 108 via an alert query with key word, fuzzy logic or other search algorithm and transmit related informational data to the interested party. In this manner, ongoing diligence can be conducted. In the event that new information is uncovered by the alert query, the subscriber 111 can be immediately notified, or notified according to a predetermined schedule. Appropriate action can be taken according to the information uncovered.

In some embodiments, the RMC database 108 can contain only information collected from publicly-available sources relevant to the provision or regulation of the Construction Industry. A subscriber 111 can use the RMC database 108 to identify the possibility that a Construction Industry project or Construction Industry company is involved with inappropriate, illegal, politically volatile, socially adverse, immoral or other questionable activity. In addition, an RMC 109 can be useful in determining whether the Construction Industry company is fiscally viable.

A subscriber 111 to the RMC system 109 can access the database 108 electronically and receive relevant information electronically or in hard copy format. A subscriber 111 can be permitted to access information in the RMC system 109 in various ways, including, for example: system to system inquires involving single or batch screening requests, individual inquiries (submitted electronically, by facsimile, or by phone), or through a web-based interface supporting various query types.

In some embodiments, an RMC system 109 can take any necessary steps so as not to be regulated as a consumer reporting agency. Such steps may include not collecting or permitting others to use information from the RMC database 108 to establish an individual's eligibility for consumer credit or insurance, other business transactions, or for employment or other Fair Credit Reporting Act (FCRA) covered purposes such as eligibility for a government benefit or license.

To satisfy the requirements of such embodiments, a subscription agreement to an RMC system 109 can be established between the RMC system 109 provider and a subscriber 111 which will create enforceable contractual provisions prohibiting the use of data from the RMC database 108 for such purposes. The operations of the RMC system 109 can be structured to minimize the Risk that the RMC database 108 will be used to furnish consumer reports and therefore become subject to the FCRA.

Some embodiments can also include additional policies and practices which are established to achieve the objective of not being subject to FCRA, such as, for example: the information in the RMC database 108 can be collected only from reputable, publicly available sources and not contain information from consumer reports; the RMC system 109 can forego collection of or permit others to use, information from the RMC database 108 to establish an individual's eligibility for consumer credit or insurance, other business transactions, or for employment or other FCRA-covered purposes. Subscribers 111 can be required to execute a licensing agreement that will limit their use of the data to specified purposes. A subscriber 111 can be required to certify that the subscriber 111 will use the data only for such specified purposes, and to certify annually that the subscriber 111 remains in compliance with these principles.

A licensing agreement can also require that subscribers 111 separately secure information from non-RMC system 109 sources to satisfy any need the subscriber 111 has for information to be used in connection with the subscriber's determination regarding a consumer's eligibility for credit, insurance, other business transactions, or employment or for other FCRA-covered purposes.

In some embodiments, a RMC system 109 can be structured to take advantage of the immunity from liability for libel and slander granted by the Communications Decency Act ("CDA") to providers of interactive computer services. Where its operations are not protected by the CDA, an RMC system 109 may be able to reduce its Risk of liability for defamation substantially by relying only on official sources and other reputable sources, and taking particular care with defamatory information from unofficial sources. In addition the RMC system 109 provider can take reasonable steps to assure itself of the information's accuracy, including insuring that the source of the information is reputable.

In some embodiments, a RMC system 109 can operate as an interactive computer service as that term is defined in the CDA. In such embodiments, the clearinghouse can provide an information service and/or access software that enables computer access by multiple users to a computer server. In some embodiments, if desired, an RMC system 109 provider can limit its employees or agents from creating or developing any of the content in the RMC database 108. Content be maintained unchanged except that the RMC system 109 can remove information from the RMC database 108 that it determines to be inaccurate or irrelevant.

Some embodiments can also include a value rating, such as a risk quotient which can be generated to readily indicate a level of risk associated with a particular Risk subject. The risk quotient can be based upon a weighted algorithm applied to the Risk variables or other factors. The risk quotient can be made available on a periodic basis, on demand in real time, in response to an event such as an inquiry a placement or an investment; or according to some other request. Actions commensurate with a risk level can be presented to assist with proper risk management.

If desired, embodiments can include a comparison of risk related data and risk quotients for disparate entities. The comparison can include data and sources of the data as well as a risk quotient value rating of an amount of risk that can be associated with each Risk subject. Risk can be mitigated by the association of a Risk subject with Risk variables that contain less inherent risk, such as a public organization subject to reporting requirements, or a facility associated with a Construction Industry company that enjoys an excellent reputation.

Figure 2:
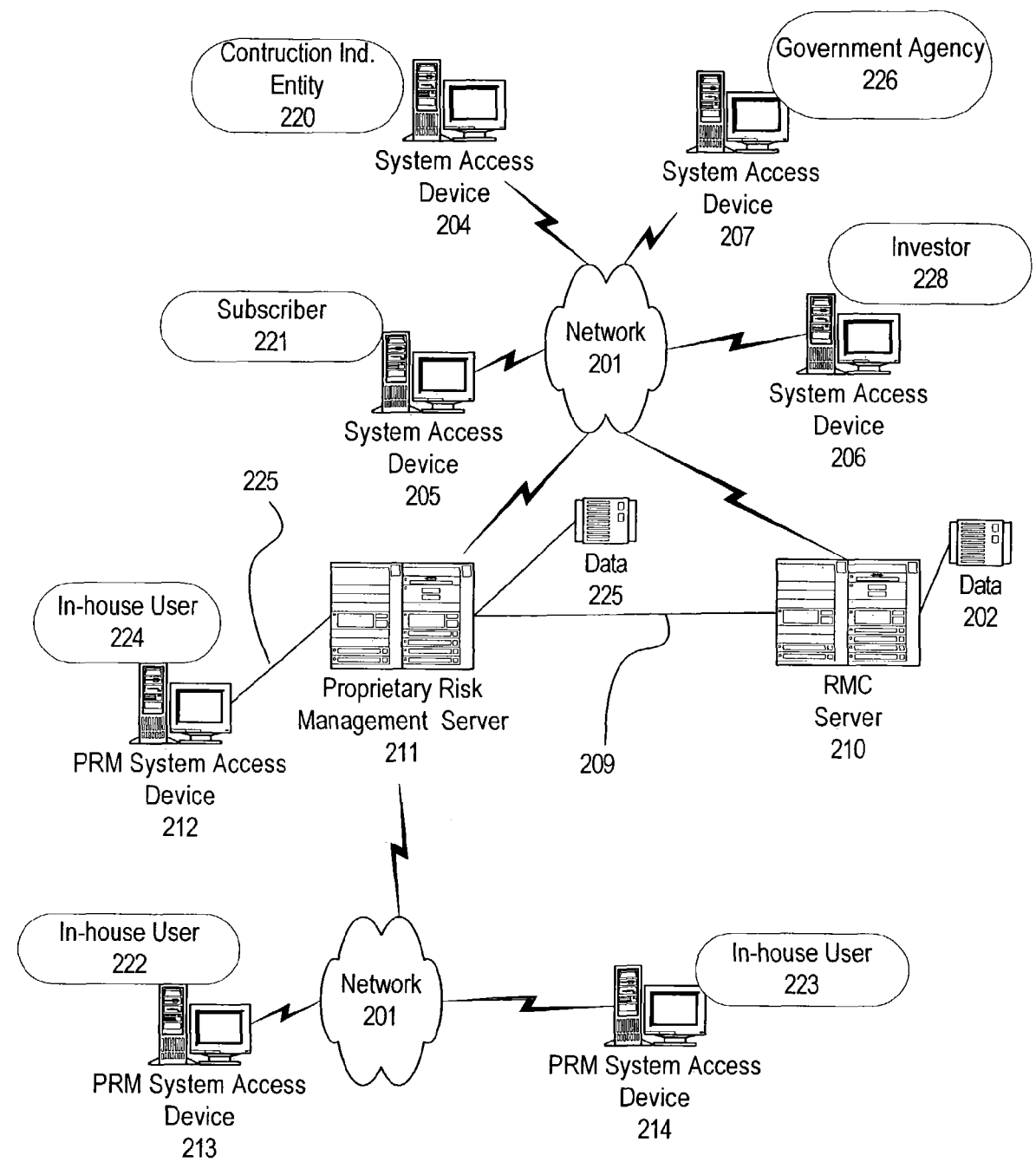
FIG. 2 illustrates a network of computer systems that can embody an automated RMC risk management system.

Referring now to FIG. 2, a network diagram illustrating some embodiments of the present invention is shown 200. An automated RMC 109 can include a computerized RMC server 210 accessible via a distributed network 201 such as the Internet, or a private network. A subscriber 221, Construction entity 220, government agency 226, investor 228, or other party interested in Risk management, can use a computerized system or network access device 204-207 to receive, input, transmit or view information processed in the RMC server 210. A protocol, such as the transmission control protocol internet protocol (TCP/IP) can be utilized to provide consistency and reliability.

In addition, a PRM server 211 can access a RMC server 210 via the network 201 or via a direct link 209, such as a TI line or other high speed pipe. The PRM server 211 can be accessed by an in-house user 222-224 via a system access device 212-214 and a distributed network 201, such as a local area network, or other private network, or even the Internet, if desired. An in-house user 224 can also be situated to access the RMC server 210 via a direct link 225, or any other system architecture conducive to a particular need or situation.

A computerized system or system access device 204-207 212-214 used to access the RMC server 210 or the PRM server 211 can include a processor, memory and a user input device, such as a keyboard, mouse, touch screen or other device and a user output device, such as a display screen and/or printer. The system access devices 204-207, 212-214 can communicate with the RMC server 210 or the PRM server 211 to access data and programs stored at the respective servers 210-211. The system access device 212-214 may interact with the server 210-211 as if the RMC Risk management system 211 were a single entity in the network 200. However, the servers 210-211 may include multiple processing and database sub-systems, such as cooperative or redundant processing and/or database servers that can be geographically dispersed throughout the network 200.

The PRM server 211 includes one or more databases 225 storing data relating to proprietary Risk management. The RMC server 210 and the PRM server 211 may interact with and/or gather data from an operator of a system access device 220-224 226 228 or other source. Data received may be structured according to Risk criteria and utilized to calculate a Risk quotient.

Typically an in-house user 222-224 or other user 220-221, 226, 228 will access the RMC server 210 using client software executed at a system access device 204-207, 212-214. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from the RMC server 210 to the network access device 204-207, 212-214 and executed at the system access device 204-207, 212-214 or computer, as part of the RMC Risk management software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
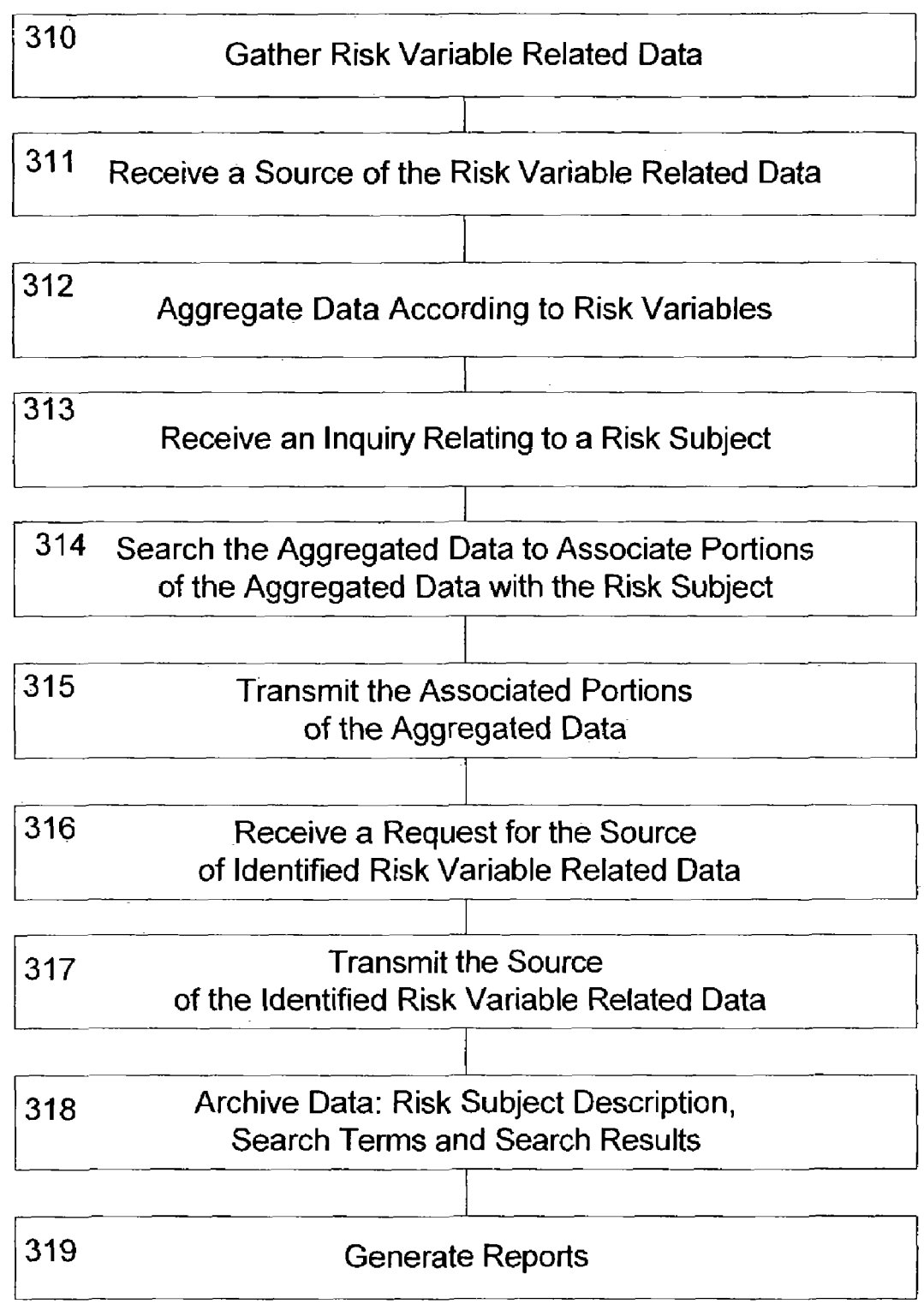
FIG. 3 illustrates a flow of exemplary steps that can be executed by a system implementing the present invention.

Referring now to FIG. 3, steps taken to manage Risks associated with the Construction Industry can include gathering data relating to Risk entities and other Risk variables 310 and receiving the gathered information into an RMC server 210. Informational data can be gathered from a source of electronic data such as, for example: an external database, a messaging system, a news feed, a government agency, any other automated data provider, a private investigation firm, a court reporter, a state regulator, an insurance company, a Construction Industry project, a Construction Industry company, a project owner or affiliate or other source. Information can be received on an ongoing basis such that if new events occur in the world that affect the Risk associated with the Construction Industry project or Construction Industry company, the calculated Risks can be adjusted accordingly.

A source of Risk variable data can also be received 311 by the RMC server 210 or other provider of Risk management related data. For example, a source of Risk variable data may include: a Construction Industry entity, a government agency, an investigation firm, public records, news reports, publications issued by a commercial insurer, other government and non-government organizations, internet websites, news feeds, commercial databases, or other information sources.

The RMC server 210 can aggregate the data received according to Construction Industry Risk variables 312 or according to any other data structure conducive to fielding Construction Industry related Risk.

A RMC server 210 can be accessed in real time, or on a periodic basis. In real time embodiments, any changes to the RMC data 108 may be automatically forwarded to a subscriber 111 or an in-house PRM system 109. With embodiments utilizing periodic access, the RKMC system 109 can be scheduled to receive queries at set intervals.

All data received can be combined and aggregated 312 to create an aggregate source of data which can be accessed to perform Risk management activities. Combining data can be accomplished by any known data manipulation method. For example, the data can be maintained in separate tables and linked with relational linkages, or the data can be gathered into a comprehensive table or other data structure. In addition, if desired, information received can be associated with one or more variables including a number of violations received during a time period and the type of violation; a quantity of complaints filed and the reason for such complaints; any fines levied against a Construction Industry company; employment history of a key employee of a Construction Industry company; a record of conviction for any employee of a Construction Industry company; types of gambling offered by the Construction Industry company; affiliations of a Construction Industry project, which can include both domestic and foreign affiliates; financial statements relating to the Construction Industry project or Construction Industry company; any instances of making accounts available from one facility to another facility, including such availability on an international basis, any records relating to bankruptcy associated with a Construction Industry company, or other data.

The RMC server 210 or PRM server 211 can receive an inquiry relating to a Risk subject 313. The Risk subject can be any subject related to the variables discussed above, for example, a Risk subject can include a Construction Industry project, a Construction Industry company, the name of the Construction Industry company employee, or other related subject.

The inquiry from a subscriber 111, or other authorized entity, can cause the respective servers 210-211 to search the aggregated data 108 and associate related portions of aggregated data 108 with the Risk subject 314. The associated portions of aggregated data 108 can be transmitted 315 to a party designated by the requesting subscriber 111.

The RMC server 210 or PRM server 211 may also receive a request for a source of identified Risk variable related data 316, in which case, the RMC server 210 or PRM server 211 can transmit the source of the identified Risk variable related data to the requestor 317. The source may be useful in ascertaining the credibility of the Risk variable related data, to follow up with a request for additional information or other purpose.

A RMC server 210 or PRM server 211 can also store in memory, or otherwise archive Risk management related data 108 and proceedings 318. Archived Risk management related data and proceedings can be useful to demonstrate historical perspective or quantify due diligence efforts relating to high Risk situations. Accordingly, reports quantifying Risk subjects researched, Risk management procedures, executed due diligence, corporate governance or other matters can be generated 319.

Referring now to FIG. 4, the present invention can also include steps that allow an RMC server 210 or PRM server 211 to provide data augmenting functionality that allows for more accurate processing of data related to Risk management. Accordingly, a RMC server 210 or PRM server 211 can aggregate Risk variable related data 410 and also the source of the Risk variable related data 411. The RMC server 210 or PRM server 211 can also enhance the Risk variable related data, such as through data scrubbing techniques or indexing as discussed above. A Risk subject description can also be received 413 and also scrubbed or otherwise enhanced 414.

An inquiry can be performed against the aggregated and enhanced data 415. In addition, an augmented search that incorporates data mining techniques 416 can also be included to further expand the depth of knowledge retrieved by the inquiry. If desired, a new inquiry can be formed as a result of the augmented search. This process can continue until the inquiry and augmentation ceases to add any additional meaningful value.

As discussed above, any searching and augmentation can be archived 417 and reports generated to quantify the due diligence efforts 418.

Referring now to FIG. 5, a flow chart illustrates steps that a user, such as a subscriber 111, can implement to manage Risk associated with a transaction or other Risk related event. The user can receive information descriptive of a Risk subject, such as an entity associated with the Construction Industry 510. The user can access an RMC server 210 and identify to the RMC server 210 one or more Risk variables or search subjects related to the Construction Industry 511. Access can be accomplished by opening a dialogue with an RMC system 211 with a network access device, 204-207, 212-214. Typically, the dialogue would be opened by presenting a GUI to a network access device accessible by a person or an electronic feed that will enter information relating to the transactor. The GUI will be capable of accepting data input via a network access device. An example of a GUI would include a series of questions relating to a Construction Industry variable. Alternatively, information can be received directly into fields of a database 108, such as from a commercial data source.

In some embodiments, automated monitoring software can run in the background of a normal transaction program and screen data traversing an application. The screened data can be processed to determine key words wherein the key words can in turn be presented to the RMC server 210 as Risk subjects or Risk variables. The RMC server 210 will process the key words to identify entities or other Risk variables. Monitoring software can also be installed to screen data traversing a network or communications link.

For example, monitoring software may be utilized in conjunction with software utilized for investment applications, public relations applications, business transactions, political donations or other at Risk activities. The monitoring software can screen data and automatically implement Risk searches related to the Construction Industry.

The user will receive back information relating to Risk associated with the submitted subject 512. Embodiments can allow information to include images of documents, structured data, enhanced data, such as scrubbed data, or other type of data presentation. In some embodiments, a user can receive data resulting from ongoing monitoring of key words, identified entities, Construction Industry project, Construction Industry company or other subject, or list of subjects. Any updated information or change of status detected via an ongoing monitoring can result in an alarm or other alert being sent to one or more appropriate recipients. A user can also receive augmented information 513, such as data that has been processed through data mining techniques discussed above.

In addition to receiving augmented information 513, a user can also request an identifier, such as a link, to a source of information 514. Receipt of a link or contact information pertaining to a source of information 515 may be useful to pursue more details relating to the information, or may be utilized to help determine the credibility of the information received.

A user can also cause an archive to be created relating to the Risk management 516. An archive may include, for example, information received relating to Risk associated with a Construction Industry project or company, inquiries made and results of each inquiry. In addition, the user can cause an RMC server 210 to generate reports to quantify the archived information and otherwise document diligent actions taken relating to Risk management 517.

Referring now to FIG. 6, additional method steps are illustrated which can implement some embodiments of the present invention. At 610, it can be indicated in a computer system that an entity is a construction industry entity according to the entity's engagement in at least one of: design, building, manufacture, repair and maintenance, of one or more man made structures. At 611, data can be gathered into the computer system. The data can be generally related to one or more construction industry entities. At 612, additional data can be received into the computer system that is descriptive of details of a financial transaction involving a construction industry entity. The data can include, for example, identification data for at least one construction industry entity. At 613, the gathered data and the data relating details of the financial transaction can be structured according to risk quotient criteria and at 614 a risk quotient can be calculated by referencing the structured data. At 615, a report can be generated that includes the risk quotient and portions of the structured data which have been referenced to calculate the risk quotient.

Figure 7:
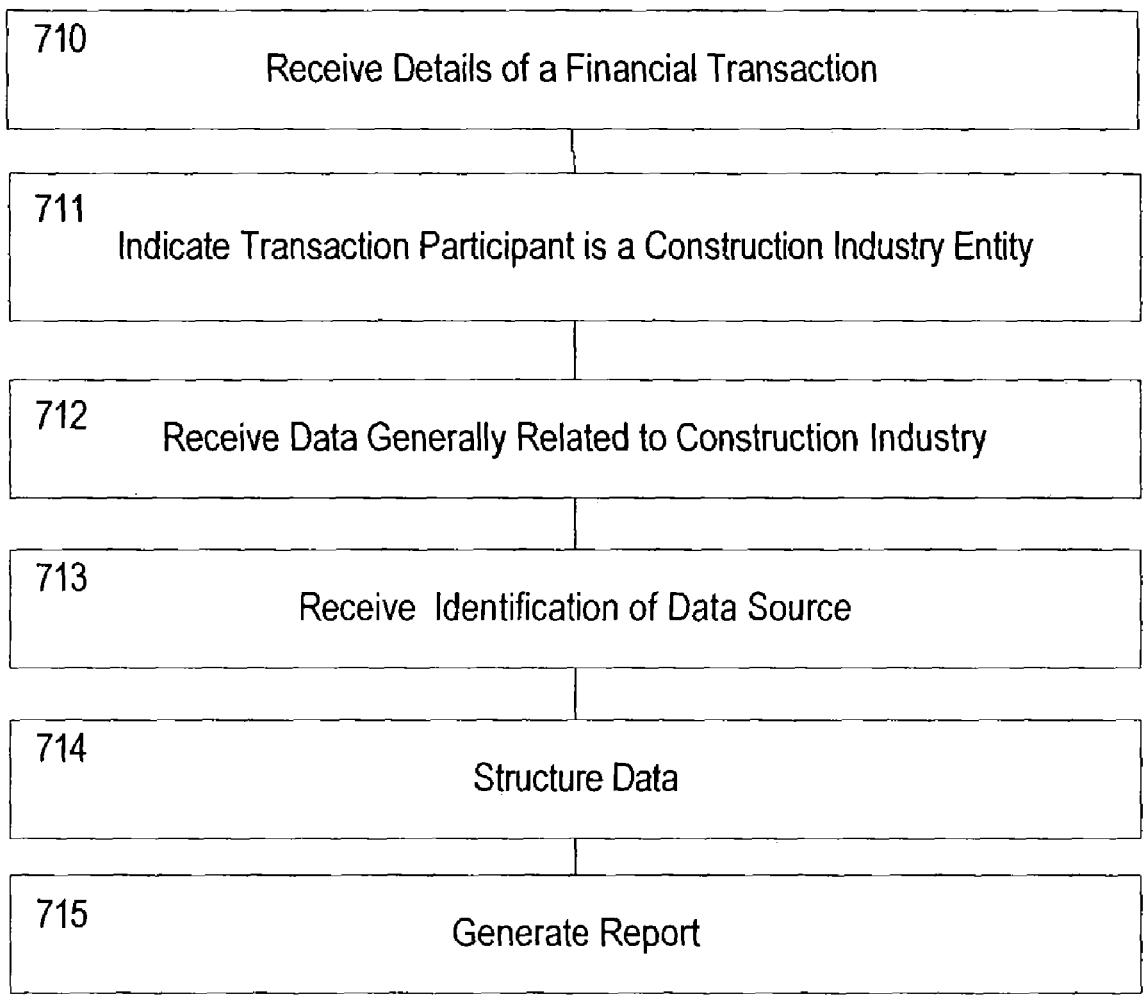

Referring now to FIG. 7, still other method steps are illustrated which can implement some embodiments of the present invention. At 710, data can be received into a computer system data that is relating to details of a financial transaction. The details of the transaction can include, for example, identification data for at least one transaction participant. At 711, it can be indicated in the computer system that the transaction participant is a construction industry entity. The indication can be based upon the transaction participant's engagement in at least one of: design, building, manufacture, repair and maintenance, of one or more man made structures. At 712, data can be received into the computer system that is generally related to one or more construction industry entities and at 713, an indication of the source of the received data can be received into the computer system.

At 714, the received data generally related to one or more Construction Industry Entities can be structured according to risk criteria. The risk criteria can include, for example, personnel employed by the Construction Industry Entity; litigations involving a Construction Industry Entity; types of activities undertaken by a Construction Industry entity; government or regulatory actions related to the Construction Industry; history of fraud or money laundering associated with a Construction Industry Entity; felony history associated with an employee of a Construction Industry Entity; building materials associated with a Construction Industry project; and labor relations involving a Construction Industry Entity. At 715, a report can be generated that relates to risk due diligence. The report can include, for example, an indication that the transaction participant is a construction industry entity, portions of the structured data which relates to the Construction Industry Entity and an indication of the source of the structured data.

Referring now to FIG. 8, a portion of a data structure that can be utilized with some embodiments of the present invention is illustrated. The data structure 800 can include, for example, a data field for storing Risk variables 802, a data field for storing the Construction Industry company or other provider 804, a data filed for storing a description of a publication or other document description 806, a data field for storing a description of an identification of a source of information 808, or other data fields. Data structures 600 can include relational data, hierarchical data, flat files or other formats known in the arts.

Some embodiments can include recorded or programmed associations between any data received and perceived or actual risks. For example, A rise in interest rates may be programmed to indicate a decline in new construction starts and/or renovations. Similarly, risk criteria, such as a change in building ownership or tenancy, or zoning can be linked to Construction Industry Entities active in a particular geo-political area. In another aspect, discovery of toxic substances, or other environmental hazards may also impact a Construction Industry Entity.

A number of embodiments of the present invention have been described. Nevertheless, it will be understood that various modifications may be made without departing from the spirit and scope of the invention. For example, a RMC server 210 can be made available on the Internet and receive input descriptive of a Risk subject or be made available through a commercial information provider. In addition, the Construction Industry related risk quotient can be compared to a threshold level of Risk generally acceptable for a particular circumstance. Some embodiments can also include transmission of suggested actions responsive to a Risk quotient. Accordingly, other embodiments are within the scope of the following claims.

What is claimed is:

1. A computer-implemented method for managing risk related to a construction industry, the method comprising:
   indicating in a computer system that an entity is a construction industry entity according to the entity's engagement in at least one of: design, building, manufacture, repair and maintenance, of one or more man made structures;
   gathering data into the computer system generally related to one or more construction industry entities;
   receiving data into the computer system descriptive of details of a financial transaction involving a construction industry entity, wherein the data received comprises identification data for at least one construction industry entity;
   structuring the gathered data and the data relating details of the financial transaction according to risk quotient criteria;
   calculating in the computer system a risk quotient by referencing the structured data, wherein calculating the risk quotient criteria comprises a value determined by the steps of:
      associating a numerical weight with each of a plurality of reputational risk variables;
      associating one or more of the reputational risk variables with the data descriptive of details of a financial transaction;
      determining a numerical value based upon the content of the data descriptive of details of a financial transaction associated with the one or more reputational risk variables; and
      multiplying the numerical value based upon the content times the numerical weight associated with each of the reputational risk variables associated with the data descriptive of details of a financial transaction; and
   generating a report comprising the risk quotient and at least some of the structured data referenced to calculate the risk quotient.

2. The method of claim 1 wherein the financial transaction comprises a financial investment in at least one of: a construction industry entity and a construction industry project.

3. The method of claim 1 wherein the financial transaction comprises engaging the services of a construction industry entity.

4. The method of claim 1 wherein the risk quotient comprises an indication of a cost to defend an adverse position.

5. The method of claim 1 wherein the risk quotient comprises an indication of an amount of regulatory risk.

6. The method of claim 1 wherein the risk quotient comprises an indication of an amount of legal risk.

7. The method of claim 1 wherein the risk quotient comprises an indication of an amount of risk associated with monetary costs related to potential fines.

8. The method of claim 1 wherein the gathered data comprises data descriptive of one or more world events which is received via a news feed.

9. The method of claim 1 wherein the gathered data comprises at least one government advisory.

10. The method of claim 1 additionally comprising the steps of presenting the report as evidence of due diligence to at least one of: a regulatory body, a shareholder and a news media.

11. The method of claim 1 additionally comprising the step of generating a suggested action based upon the risk quotient and at least some of the structured data referenced to calculate the risk quotient.

12. The method of claim 1 wherein the data gathered comprises data relating to one or more personnel employed by a construction industry entity.

13. The method of claim 1 additionally comprising the steps of: associating one or more statutes or regulations with the financial transaction; and transmitting a description of the associated statute and the report.

14. The method of claim 1 additionally comprising the step of transmitting the report to a subscriber, wherein transmission of the report is conditioned upon receipt of a contractual obligation not to use contents of the report for any purpose covered by the Fair Credit Reporting Act.

15. The method of claim 1 wherein the report comprises a record of conviction of an employee or owner of a construction industry facility.

16. The method of claim 1 wherein the report comprises data descriptive of fines levied against a construction industry facility or complaints filed against the facility.

17. The method of claim 1 wherein the report comprises one or more sources of the gathered data.

18. The method of claim 17, wherein at least one of the one or more sources comprises an investigation firm.

19. The method of claim 1 additionally comprising the step of transmitting an image of an informational artifact comprising data associated with the financial transaction.

20. The method of claim 1 wherein report does not comprise any content created or developed by a provider of the system implementing the method for managing risk associated with construction industry.

21. The method of claim 1 wherein the data is gathered into a risk management clearinghouse.

22. The method of claim 1 wherein the data descriptive of details of a financial transaction is received by a proprietary risk management system.

23. The method of claim 1 wherein at least one of the gathered data and the data descriptive of details of a financial transaction; comprise data provided by a recipient of construction industry services.

24. The method of claim 1 wherein structuring the gathered data and the data relating details of the financial transaction according to risk quotient criteria comprises processes based upon Boolean logic.

25. The method of claim 1 wherein structuring the gathered data and the data relating details of the financial transaction according to risk quotient criteria comprises relevance ranking.

26. A computerized system for managing risk associated with construction industry, the system comprising:
   a computer server accessible with a system access device via a communications network; and
   executable software stored on the server and executable on demand, the software operative with the server to cause the system to:
      indicate in a computer system that an entity is a construction industry entity according to the entity's engagement in at least one of: design, building, manufacture, repair and maintenance, of one or more man made structures;
      gather data into the computer system generally related to one or more construction industry entities;
      receive data into the computer system descriptive of details of a financial transaction involving a construction industry entity, wherein the data received comprises identification data for at least one construction industry entity;
      structure the gathered data and the data relating details of the financial transaction according to risk quotient criteria;
   calculate a risk quotient by referencing the structured data, wherein calculating the risk quotient criteria comprises a value determined by the steps of:
      associating a numerical weight with each of a plurality of reputational risk variables;
      associating one or more of the reputational risk variables with the data descriptive of details of a financial transaction;
      determining a numerical value based upon the content of the data descriptive of details of a financial transaction associated with the one or more reputational risk variables; and
      multiplying the numerical value based upon the content times the numerical weight associated with each of the reputational risk variables associated with the data descriptive of details of a financial transaction; and
   generate a report comprising the risk quotient and at least some of the structured data referenced to calculate the risk quotient.

27. Computer executable program code residing on a computer-readable medium, the program code comprising instructions for causing the computer to:
   indicate in a computer system that an entity is a construction industry entity according to the entity's engagement in at least one of: design, building, manufacture, repair and maintenance, of one or more man made structures;
   gather data into the computer system generally related to one or more construction industry entities; receive data into the computer system descriptive of details of a financial transaction involving a construction industry entity,
   wherein the data received comprises identification data for at least one construction industry entity;
      structure the gathered data and the data relating details of the financial transaction according to risk quotient criteria; calculate a risk quotient by referencing the structured data, wherein
   calculating the risk quotient criteria comprises a value determined by the steps of: associating a numerical weight with each of a plurality of reputational risk variables;
      associating one or more of the reputational risk variables with the data descriptive of details of a financial transaction;

determining a numerical value based upon the content of the data descriptive of details of a financial transaction associated with the one or more reputational risk variables; and multiplying the numerical value based upon the content times the numerical weight associated with each of the reputational risk variables associated with the data descriptive of details of a financial transaction; and generate a report comprising the risk quotient and at least some of the structured data referenced to calculate the risk quotient.

* * * * *

UNITED STATES PATENT AND TRADEMARK OFFICE
CERTIFICATE OF CORRECTION

PATENT NO. : 7,548,883 B2 Page 1 of 1
APPLICATION NO. : 10/633080
DATED : June 16, 2009
INVENTOR(S) : David Lawrence It is certified that error appears in the above-identified patent and that said Letters Patent is hereby corrected as shown below:

On the Title Page:

Item (74), under Attorney, Agent or Firm, second line, delete "Chadbounre" and insert -- Chadbourne --.

In the specification:

Col. 10, line 56, delete "11" and insert -- 111 --.

Col. 14, line 66, delete "RKMC" and insert -- RMC --.

Signed and Sealed this

First Day of September, 2009

David J. Kappos
*Director of the United States Patent and Trademark Office*